US007076033B2

(12) United States Patent
Sidhu et al.

(10) Patent No.: US 7,076,033 B2
(45) Date of Patent: *Jul. 11, 2006

(54) BIT RATE MATCHING SYSTEM AND METHOD

(75) Inventors: Harjot S. Sidhu, Kitchener (CA); Ashok C. Patel, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/946,754

(22) Filed: Sep. 22, 2004

(65) Prior Publication Data

US 2005/0036595 A1    Feb. 17, 2005

Related U.S. Application Data

(63) Continuation of application No. 10/403,682, filed on Mar. 31, 2003, now Pat. No. 6,798,869.

(51) Int. Cl.
*H04M 11/00* (2006.01)

(52) U.S. Cl. .................................. 379/93.08

(58) Field of Classification Search ............. 379/93.08, 379/93.28–93.34; 375/222, 225
See application file for complete search history.

(56) References Cited

U.S. PATENT DOCUMENTS

| 5,490,209 | A | * | 2/1996 | Kennedy et al. | 379/93.08 |
| 5,631,925 | A | * | 5/1997 | Koenzen | 375/225 |
| 5,799,069 | A | * | 8/1998 | Weston et al. | 379/93.33 |
| 6,072,827 | A | * | 6/2000 | Krulce | 375/225 |
| 6,678,751 | B1 | * | 1/2004 | Hays et al. | 710/8 |
| 6,798,869 | B1 | * | 9/2004 | Sidhu et al. | 379/93.33 |
| 6,847,615 | B1 | * | 1/2005 | Walter et al. | 370/252 |

OTHER PUBLICATIONS

Carroll, E.: "Auto Baud Rate Detection," An antobaud rate detection algorithm, http://www.iol.ie/~ecarroll/autobaud. html, Apr. 1989, 4 pgs.

* cited by examiner

*Primary Examiner*—Stella Woo
(74) *Attorney, Agent, or Firm*—Jones Day; Krishna K. Pathiyal; Robert C. Liang

(57) ABSTRACT

A method and system of matching a bit rate to a transmit bit rate used to transmit data on a data link are disclosed. A bit pattern in data received on the data link is detected using a bit rate. Where the detected bit pattern comprises one of a plurality of expected bit patterns, the bit rate is adjusted to an adjusted bit rate based on the detected bit pattern. In one embodiment, the adjusted bit rate is used for communications on the data link when a confirmation bit pattern is received within a predetermined time after the data is received.

15 Claims, 4 Drawing Sheets

BIT RATE MATCHING SYSTEM AND METHOD

This is a con of application Ser. No. 10/403,682 filed on Mar. 31, 2003 now U.S. Pat. No. 6,798,689.

BACKGROUND OF THE INVENTION

1. Field of the Invention

This invention relates generally to the field of data communications and in particular to determining bit rates for data transfer.

2. Description of the State of the Art

In a data transfer operation, data transmitted at a particular bit rate from one end of a data link must be received at the same rate at the other end of the data link in order to avoid errors. Several techniques for automatic bit rate detection or "autobauding", which ensures that a sending and receiving bit or data rate are the same, are currently known.

According to one known technique, a predetermined bit pattern, typically the ASCII code for the uppercase letter "A", (0x41), along with a start bit and a stop bit, is sent from one end of a data link and received by a receiver at the other end of the data link. A data link between a processor and a modem in a communication device is one such data link for which autobauding is commonly employed. At the receiver, the received start bit, data bits, and stop bit are buffered, the duration of the start bit is determined using a local clock or timer, for example, and the sending bit rate is the determined from the duration of the start bit. If the stored bits are decoded as "A" using the determined bit rate, then the sending bit rate was correctly determined, and the bit rate at the receiver is set accordingly. However, this technique requires buffering of received data during bit rate detection.

Another bit rate detection scheme involves automatic retransmission by a sender, and trial and error bit rate selection at the receiver. During bit rate detection, the receiver is configured to expect a predetermined bit pattern on the data link. A particular bit rate is selected at the receiver, and the next received byte is detected using the selected bit rate. If the predetermined bit pattern is detected, then the selected bit rate is the same as the sending bit rate, the receiver maintains the selected bit rate, and sends a response, including the predetermined bit pattern, to the sender as an indication that the bit rate has been determined correctly. Otherwise, the receiver selects another bit rate and awaits a subsequent data byte from the sender. In the absence of a response from the receiver within a predetermined time, the sender retransmits the predetermined bit pattern to the receiver. This process is repeated until the sending bit rate is selected by the receiver. Bit rate detection according to this scheme may entail several bit rate selections and byte retransmissions, and as such is typically slow.

SUMMARY

According to an aspect of the invention, a method of matching a bit rate to a transmit bit rate used to transmit data on a data link comprises the steps of receiving data on a data link, detecting a bit pattern in the received data using a bit rate, determining whether the detected bit pattern comprises one of a plurality of expected bit patterns, and adjusting the bit rate to an adjusted bit rate based on the detected bit pattern where the detected bit pattern comprises one of the plurality of expected bit patterns.

A system of matching a bit rate to a transmit bit rate used to transmit data on a data link, according to a related aspect of the invention, comprises means for receiving data on a data link, means for detecting a bit pattern in the received data using a bit rate, means for determining whether the detected bit pattern comprises one of a plurality of expected bit patterns, and means for adjusting the bit rate to an adjusted bit rate based on the detected bit pattern where the detected bit pattern comprises one of the plurality of expected bit patterns.

In accordance with another aspect of the invention, an electronic device comprises a data link, a processor connected to the data link and configured to transmit bit rate detection data on the data link using a transmit bit rate, and a modem connected to the data link, and configured to receive the bit rate detection data, to detect a bit pattern in the bit rate detection data using a receive bit rate, to determine whether the detected bit pattern comprises one of a plurality of expected bit patterns, to adjust the receive bit rate to an adjusted bit rate based on the detected bit pattern where the detected bit pattern comprises one of the plurality of expected bit patterns, and to use the adjusted bit rate for communications on the data link.

Further features of the invention will be described or will become apparent in the course of the following detailed description.

DETAILED DESCRIPTION

Figure 1:
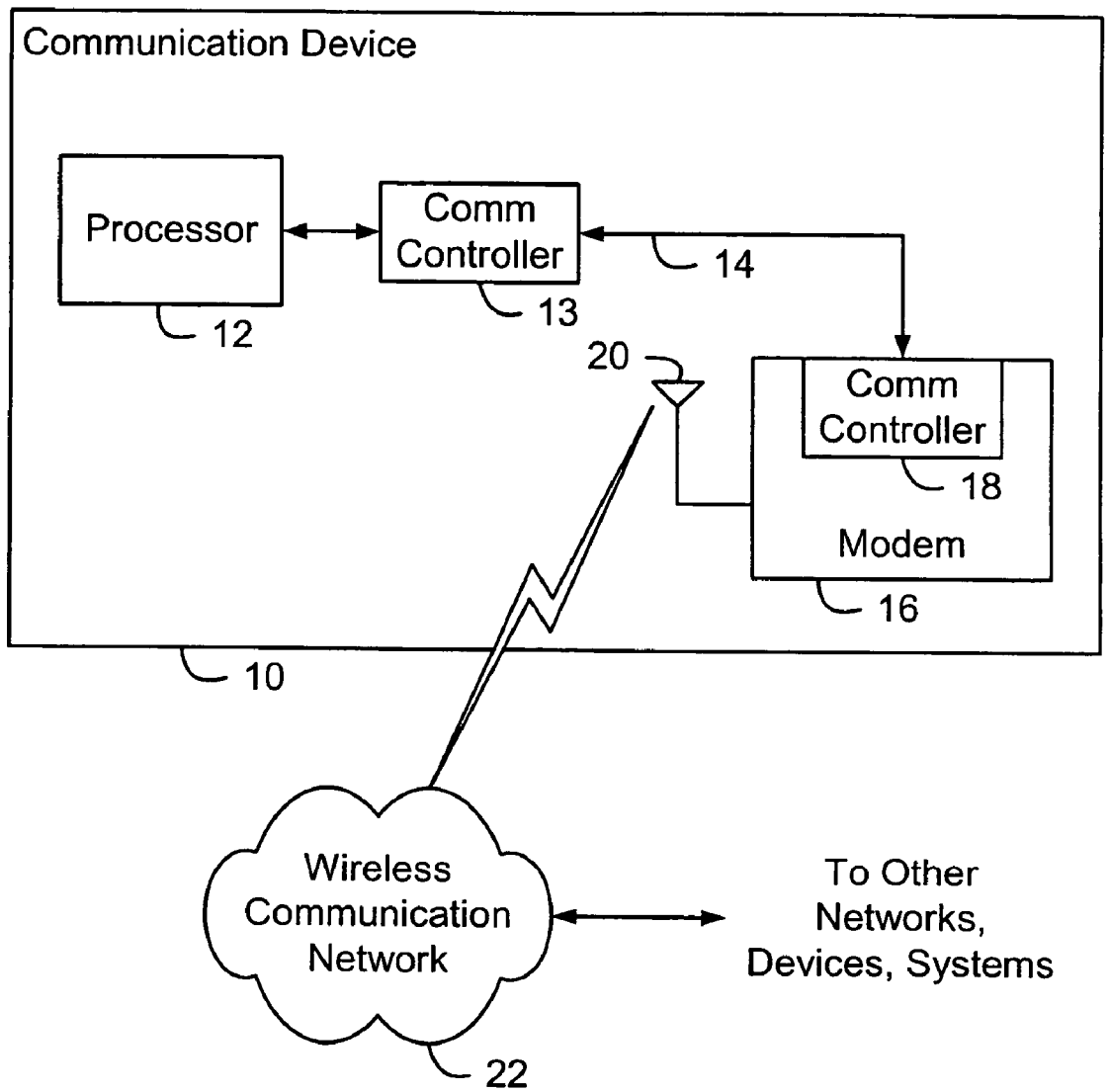
FIG. 1 is a block diagram of a communication device.

FIG. 1 is a block diagram of a communication device. The communication device 10 includes a modem 16 connected to a processor 12 via a data link 14, and an antenna 20. The modem 16 and the antenna 20 enable the communication device 10 for communications in a wireless communication network 22.

The communication device 10 is an electronic device, such as a desktop, laptop, or handheld computer, a personal digital assistant (PDA), a point of sale (POS) terminal, a control, monitoring or data acquisition terminal, for example, or some other device for which wireless communications functionality is desired or required. Although components such as the modem 16 are typically integrated into an electronic device during its manufacture, it should be appreciated that such components are sometimes purchased separately and installed by an owner or user of the device. Thus, the communication device 10 is either manufactured as a communication device incorporating the modem 16, or as an electronic device into which the modem 16 is later integrated.

The processor 12 controls operation of the communication device 10, executing operating system software and software applications, modules and utilities. Through the data link 14, the modem 16, the antenna 20, and suitably configured communications software, the processor 12 is enabled to send, receive, or both send and receive data through the wireless communication network 22.

As described briefly above, the modem 16 is either integrated into the communication device 10 during manufacture or added by an owner or user. For integration during manufacture, an internal modem is generally preferred. Where the communication device 10 is manufactured without the modem 16, the modem 16 may be an internal modem, an external modem, or a hybrid type of modem such as a Personal Computer Memory Card International Association (PCMCIA) card modem, for example. As such, the data link 14 is an internal data link for an internal modem or an insertable modem such as a card modem 16, and at least partially internal for external modems. The data link 14, although shown in FIG. 1 as a continuous link, may include multiple sections for an external modem, including an internal link between the processor and a modem interface and an external link between a connector compatible with the modem interface and the modem 16. In this case, the internal link may be a serial link to a serial port, which is compatible with a serial cable as the external link. Communications controllers 13 and 18 at each end of the data link 14 control data exchange over the link, as described in further detail below.

The modem 16, as those skilled in the art will appreciate, performs such communication functions as frequency conversion, filtering, modulation and demodulation, and digital-to-analog and analog-to-digital conversion. Data received from the processor 12 is converted into communication signals for transmission through the wireless communication network 22 via the antenna 20, and data destined for the processor 12 is extracted from communication signals received at the antenna 20.

The modem 16 and the antenna 20 are adapted for operation in the wireless communication network 22. Such operating characteristics as communication frequencies and modulation schemes are dependent upon the type of the wireless communication network 22. In North America, for example, the wireless communication network 22 might be an older data network such as a Mobitex™ network or a DataTAC™ network, and a communication device intended for operation therewith then includes a Mobitex or DataTAC modem as the modem 16. Many modern communication devices operate in newer communication networks such as the General Packet Radio Service (GPRS), which is a data overlay on a Global System for Mobile communications (GSM) network. In such devices, the modem 16 and the antenna 20 are adapted to the type of GPRS network to be accessed. Although GPRS networks exist in many regions of the world, operating frequency bands are not common to all GPRS networks. For example, the modem 16 and the antenna 20 in a GPRS communication device intended for a North American market are different than those required for operation in European GPRS networks.

Through the wireless communication network 22, data is exchanged between the communication device 10 and remote devices or systems. In some cases, the remote devices or systems are also enabled for wireless communications in the wireless communication network 22, and data is routed through the wireless communication network 22 from a sender to a receiver. Perhaps more often, communications between the data communication device 10 and a remote device or system are established through the wireless communication network 22 and one or more intervening networks or systems, including the Internet, for example.

Data exchange between the modem 16 and the processor 12 over the data link 14 is controlled by a communications controller at each end of the link. The communications controller 13 is part of the communications device 10, and may also handle communications between the processor 12 and other components of the communications device 10.

Although shown as a separate component in FIG. 1, the communications controller 13 may be either on the same circuit board as the processor 12 or off-board. In the case of a serial link, for example, the communications controller 13 is often embodied as a Universal Asynchronous Receiver/Transmitter, or UART. The communications controller 13 handles sending and receiving of data at the processor end of the data link 14. Similarly, the communications controller 18 in the modem 16 manages data sending and receiving operations at the modem end of the data link 14, and may also be a UART for a serial data link.

Figure 2:
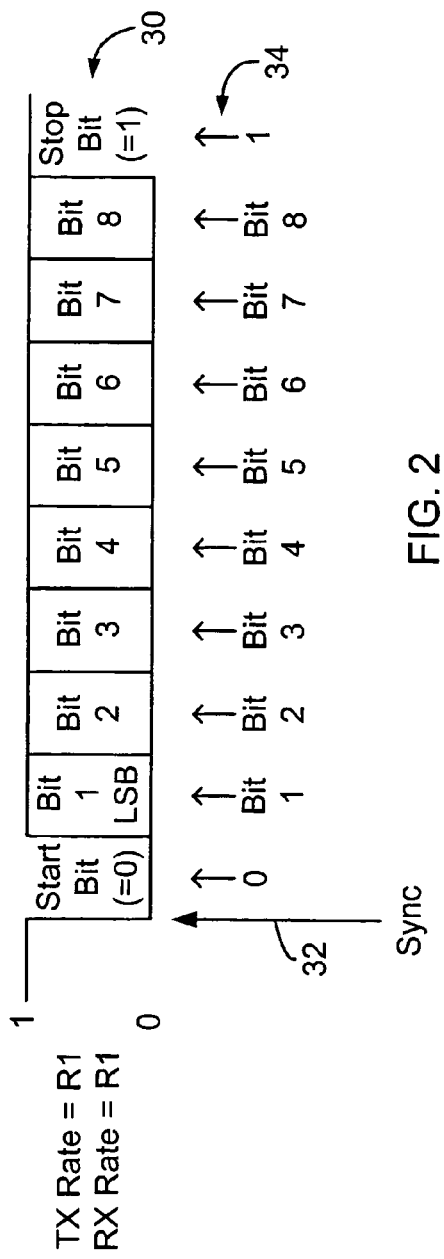
FIG. 2 is a timing diagram illustrating proper detection of a received data byte.

Each communications controller 13 and 18 relies on a local clock (not shown) in the communication device 10 and the modem 16, respectively, to establish bit timing and thus a data or bit rate. Provided the communications controllers 13 and 18 are operating at the same bit rate, data sent from one end of the data link 14 is properly detected at the other end of the link. FIG. 2 is a timing diagram illustrating proper detection of a received data byte.

On an asynchronous data link, for example, an 8-bit data byte is transferred as a 10-bit block. Although shown as 8 data bits in FIG. 2, it will be apparent to those skilled in the art that a data byte may instead comprise 7 data bits and a parity but, for example. As shown in the bit stream 30 of FIG. 2, an 8-bit data byte is ordered from least significant bit (LSB) to most significant bit, preceded by a logic low (0) start bit, and followed by a logic high (1) stop bit. In an idle state, a logic high level is maintained on the data link, and a falling edge of the start bit is detected at 32 to synchronize bit sampling. Once the falling edge of the start bit is detected, each bit is sampled, as indicated at 34, at the midpoint of a bit period. Sample timing is determined based on a bit rate at a receiving end of the link. Data bits may be either 0 or 1, and the stop bit is a 1.

Figure 3:
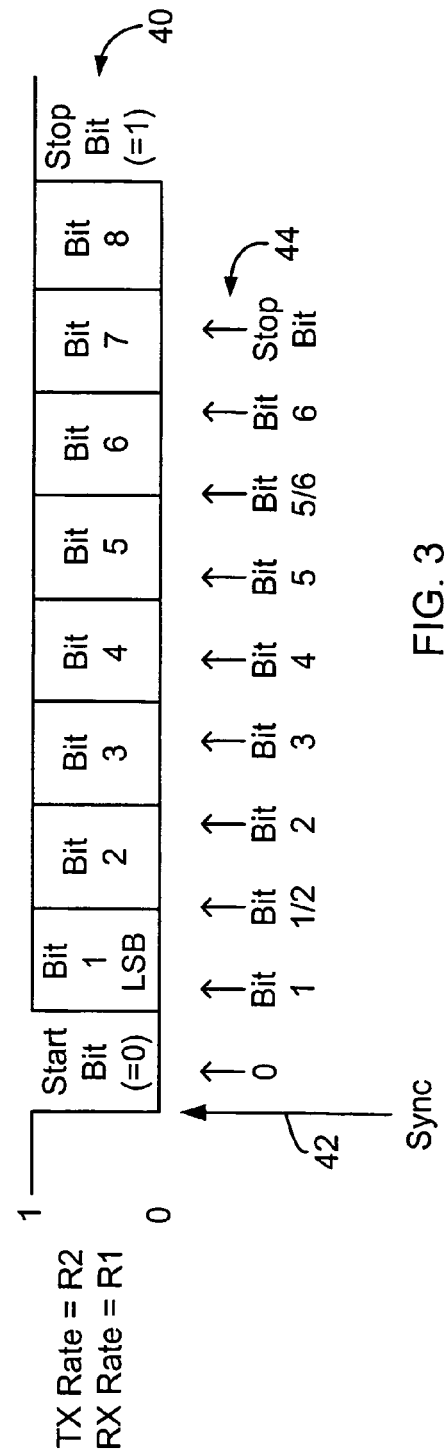
FIG. 3 is a timing diagram illustrating an effect of sending and receiving bit rate mismatch.

In FIG. 2, the transmit (TX) and receive (RX) bit rates are the same, and thus the start bit, the 8 data bits, and the stop bit are detected properly at the receiver. Provided the transmit and receive bit rates are the same, a receiver detects the data bits that were transmitted over a data link by a sender. However, if the bit rates at the ends of a data link are different, then errors arise. Referring back to FIG. 1, it is possible that the communications controllers 13 and 18 operate at different bit rates, where a newer modem 16 and communications controller 18 are integrated into an older electronic device with a slower communications controller 13, for example. FIG. 3 is a timing diagram illustrating an effect of sending and receiving bit rate mismatch.

The data byte 40 represents a bit pattern sent from a sending end of a data link under the control of a communications controller operating at the transmit bit rate R2. Although the data byte 40 was sent at the bit rate R2, the communications controller at the receiving end of the data link is operating at a different bit rate, R1. In this case, the falling edge of the start bit is detected at 42, as described above, but sample timing is determined based on the receive bit rate R1 instead of the transmit bit rate R2. Therefore, the transmitted bits are not properly detected at the receiving end of the data link.

As shown, bits 1 through 8 were transmitted, but the bit pattern b1, b1 or b2, b2, b3, b4, b5, b5 or b6, b6 is detected at the receiver. Bit 1 or bit 2 and bit 5 or bit 6 are repeated, and bit 7 is sampled as an expected stop bit. If bit 7 is a 1, and the detected bit pattern has correct parity if applicable, then the erroneous bit pattern may propagate beyond the receiving end of the data link. In the communication device 10 in FIG. 1, for example, the erroneous bit pattern may be passed to the processor 12 or transmitted from the antenna 20 to the wireless communication network 22. If bit 8 is then a 0, it may be incorrectly interpreted as a start bit, the stop bit is detected as a first data bit in a subsequent data byte, and incorrect sampling and data bit detection continue. Where bit 7 is a 0, error processing, such as declaring an error and dropping the erroneous bit pattern, is typically performed. Of course, where a parity check is performed on received data bytes, incorrect parity may also signal a data error.

In order to avoid this type of data error without requiring manual setting of bit rates, bit rate detection at one or both ends of a data link is preferred. In an embodiment of the invention, a modem is configured to determine a bit rate used by an external processor at a remote end of a data link. In a bit rate detection state, bit errors caused by bit rate mismatch are exploited to determine whether an expected bit pattern, illustratively 0xFF, is detected at a receiver, as described in detail below.

Figure 4:
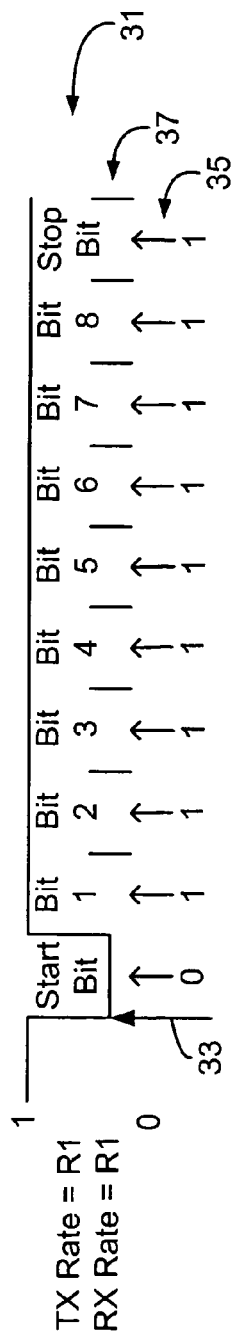
FIGS. 4–6 are timing diagrams showing bit rate detection according to an embodiment of the invention.
Figure 5:
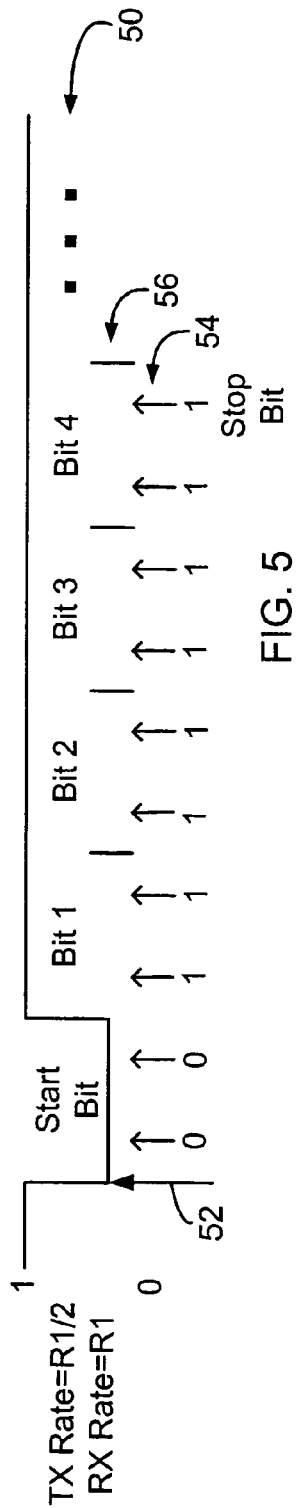
Figure 6:
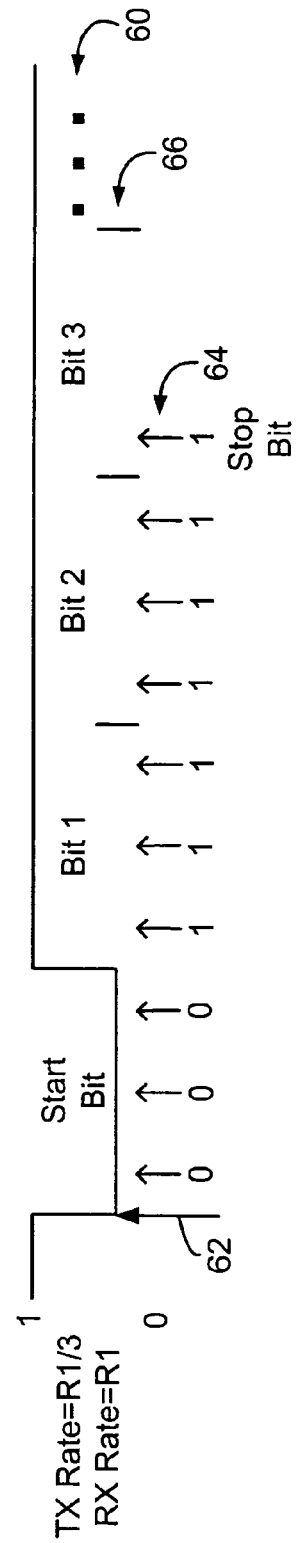

FIGS. 4–6 are timing diagrams showing bit rate detection according to an embodiment of the invention.

The timing diagram in FIG. 4 represents a situation in which the sending and receiving bit rates are equal. A transmitted bit pattern 31 includes a start bit, a data byte 0xFF (all 1's), and a stop bit. Once the falling edge of the start bit is detected at 33, each bit is sampled at the middle of a bit period, as shown at 35. Bit boundaries are shown at 37. In this case, the receiver detects the expected data byte 0xFF and determines that no bit rate adjustment is required, as the transmit and receive bit rates are already equal.

In FIG. 5, the receive bit rate R1, and thus the sample timing at 54, is the same as in FIG. 4. However, the bit pattern 50 was transmitted using a transmit bit rate of one half the receive bit rate. After the falling edge of the start bit is detected at 52, the received bit pattern 50 is sampled at bit period midpoints, as determined based on the receive bit rate R1. Since the receive bit rate is different than the transmit bit rate, the sample timing does not coincide with the bit period midpoints, as will be apparent from the bit boundaries shown at 56.

As described above with reference to FIG. 4, a bit rate detection bit pattern including a start bit, the data byte 0xFF, and a stop bit, is expected by a receiver in a bit rate detection state or mode. Although only a portion of the bit rate detection bit pattern has been shown in FIG. 5 in order to avoid congestion, it should be appreciated that the transmitted bit pattern 50 includes the entire bit rate detection bit pattern.

The bit pattern 50 is sampled twice per bit period where the receive bit rate is twice the transmit bit rate. Thus, the start bit is sampled twice instead of just once, such that the LSB of the received data byte, corresponding to the second bit sample at the receiver, is detected as a 0 instead of a 1. The bit pattern 01111111, or 0xFE, is detected by the receiver. Since bit 4 is a 1, the second sample of bit 4 detects a 1 and is interpreted as a stop bit. Although only bits 1 through 4 are detected by the receiver in this example, all subsequent data bits and the stop bit are 1's, and further bit detection errors based on incorrectly detecting a subsequent 0 as a start bit are thereby avoided.

The receiver, such as the modem 16 shown in FIG. 1, is configured to expect the data byte 0xFF during bit rate detection. When a data byte of 0xFE is detected as shown in FIG. 5, one extra sample of the start bit has been interpreted as the least significant bit of a received data byte, and the receiver determines that the transmit bit rate is one half the receive bit rate. A local clock or timing circuitry at the receiver is then adjusted so that the receive bit rate is reduced to match the transmit bit rate so that subsequently transmitted data bytes are properly detected at both ends of the data link. The adjusted bit rate is then used at both ends of the data link for sending data to and receiving data from the other end of the data link.

In reference to FIG. 1, a newer modem such as 16 often includes a communications controller 18 that supports higher bit rates than the communications controller 13 in an electronic device. Bit rate detection and adjustment as described above allows a modem to be set to its highest supported bit rate by default, since the bit rate can then be reduced whenever necessary. Electronic devices with comparable communications controllers can take advantage of the highest bit rate supported by a communications controller in an integrated modem, while such a modem remains compatible with slower communications controllers.

FIG. 6 shows another example of transmit bit rate detection where the transmit bit rate is one third the receive bit rate. As in FIG. 5, only a portion of the bit rate detection bit pattern is shown at 60 in order to avoid congestion in the drawing. After the falling edge of the start bit is detected at 62, the receiver samples the transmitted bit pattern three times per bit period, as indicated by the sample times 64 and the bit period boundaries 66. In this case, the second and third samples of the start bit are interpreted as the two least significant bits of a received data byte, such that the transmitted data byte 0xFF is received as 0xFC. As above, detection of 0xFC during bit rate detection triggers the receiver to reduce its bit rate to R1/3.

Other fractional transmit bit rates are similarly detected at a receiving end of a data link. The start bit is effectively "extended", as described above, dependent upon the transmit and receive bit rates. For example, a data byte of 0xFF transmitted at one quarter a receive bit rate is received as 0xF8. When transmitted at a bit rate of one fifth a receive bit rate, the start bit is sampled five times. Four of these samples are interpreted as the four LSBs of a received bit pattern, such that 0xF0 is detected at the receiver. For a transmit bit rate of one sixth a receive bit rate, 0xE0 is received. In general, a start bit is sampled n times when a receive bit rate is n times a transmit bit rate, and a receiver interprets n-1 sample of the start bit as the n-1 LSBs of a received bit pattern. Since the expected data byte 0xFF comprises 8 bits, a transmit bit rate as low as one eighth a receive bit rate can be detected as described above. In this case, 0xFF is received as 0x80. Where a start bit is sampled 9 times, the transmit bit rate could be either one ninth the received bit rate or less. However, it is unlikely that a modem will be implemented in a system in which such a large bit rate mismatch exists.

After a receiver determines whether the bit rate detection bit pattern, 0xFF, or one of a plurality of predetermined bit patterns, such as 0xFE, 0xFC, 0xF8, or 0xE0, has been received, its bit rate is adjusted accordingly. According to another aspect of the invention, a receiver is configured to await a confirmation bit pattern following bit rate detection. A sender first transmits the data byte 0xFF for bit rate detection, and within a predetermined time interval thereafter, transmits the confirmation bit pattern. Unless the confirmation bit pattern is detected by the receiver within the predetermined time interval, then the receiver reverts to a default bit rate or maintains a bit rate that was effective before bit rate detection was invoked. If the transmit bit rate has been detected properly, then the confirmation bit pattern is received correctly, and normal modem operations resume with the bit rate adjusted according to the detected transmit bit rate.

Figure 7:
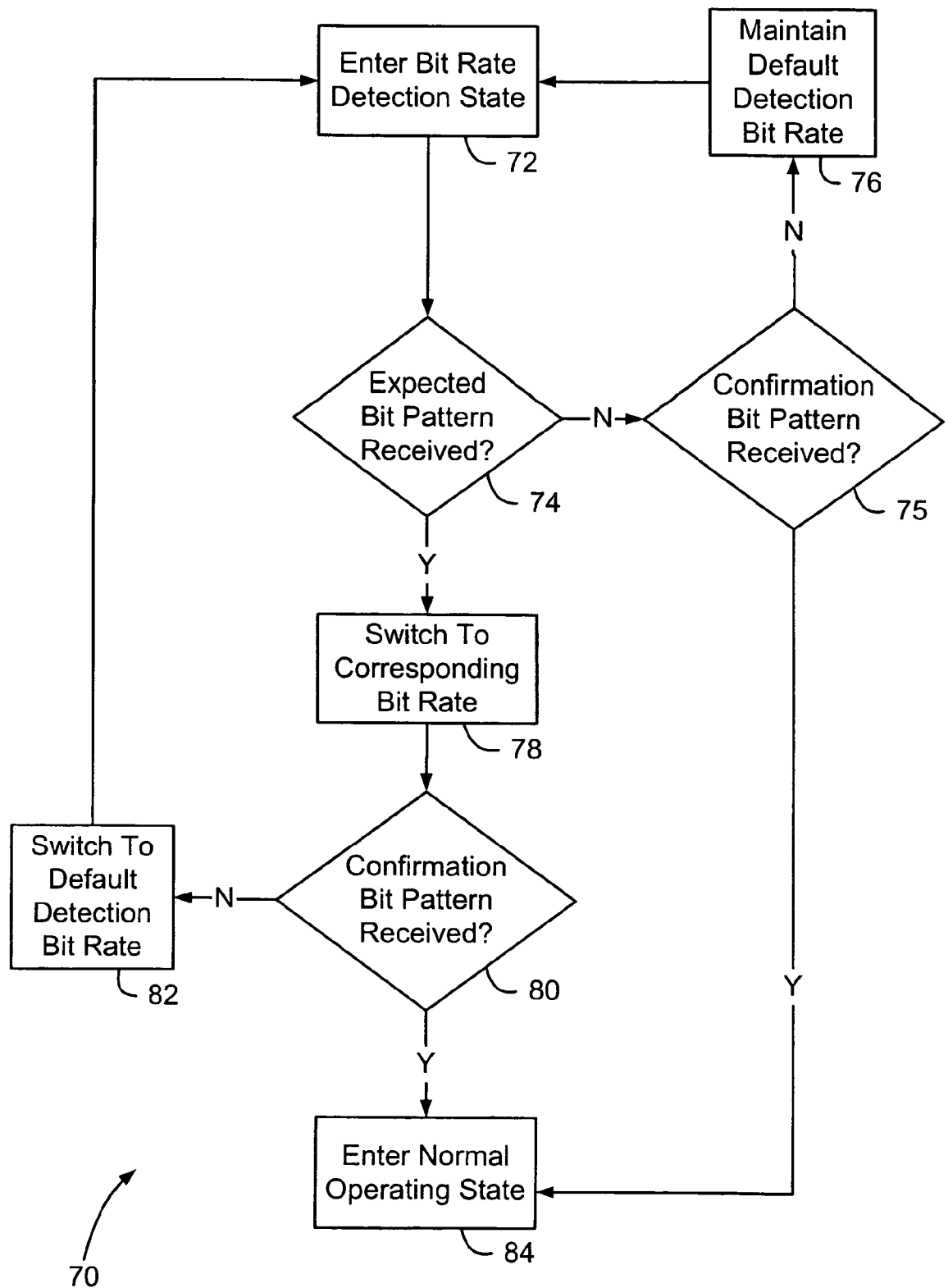
FIG. 7 is a flow diagram of a method of bit rate matching.

FIG. 7 is a flow diagram of a method of bit rate matching. The method 70 includes the steps performed at a receiving end of a data link to detect and match a bit rate used at a remote sending end of the data link. For the detection method 70, which includes confirmation of a detected bit rate, the sending end preferably transmits a bit rate detection bit pattern such as the data byte 0xFF, followed by a confirmation bit pattern. Although referred to primarily as a receiving end or a receiver and a sending end or a sender, it should be appreciated that these receiving and sending characterizations are solely for the purposes of bit rate detection. In a preferred embodiment of the invention, a modem performs bit rate detection to detect a bit rate used by an external processor or a communications controller associated with the external processor. Data links are typically bi-directional, such that the receiver during bit rate detection, the modem in this embodiment, is the sender when data destined for the external processor is received by the modem.

At step 72, the receiver enters a bit rate detection state, in response to a user command, for example, or at some point during modem installation and configuration. Since bit rates of one $n^{th}$ (n an integer) a receiver bit rate are detected as described above, the receiver is preferably set to a maximum supported bit rate at step 72 so that bit rates at or below the maximum bit rate can be detected.

The receiver then determines, at step 74, whether an expected bit pattern has been received. The bit rate detection bit pattern and any of a plurality of predetermined bit patterns arising from start bit extension comprise expected bit patterns. Where none of the expected bit patterns is received, then the receiver determines at step 75 whether the confirmation bit pattern has been received. Where the confirmation bit pattern has been received, a current bit rate is maintained, and the receiver enters a normal operating state at step 84 and uses the current bit rate for communications over the data link. Step 75 allows a sender to transmit the confirmation bit pattern without first sending the bit rate detection bit pattern, to effectively select a highest supported bit rate used for bit rate detection, for example. If neither an expected bit pattern nor the confirmation bit pattern is received, then a default bit rate used at the receiver for bit rate detection, preferably a maximum bit rate, is maintained at step 76, and processing reverts back to step 72 to await a data transmission from the sender.

When an expected bit pattern is detected, the receiver adjusts its bit rate accordingly, at step 78. If 0xFF was received, then the current detection bit rate is maintained. Otherwise, another bit rate is selected. The receiver then awaits a confirmation bit pattern at step 80. If the confirmation bit pattern is correctly received, then the receiver enters a normal operating state at step 84, and uses the adjusted bit rate for communications over the data link. Where the receiver does not receive the confirmation bit pattern within a predetermined period of time, then at step 82 it switches to or maintains a default bit rate used for bit rate detection, such as the maximum bit rate, and the method reverts back to step 72. Thus, bit rate adjustments take effect only when confirmed.

Those skilled in the art will appreciate that the method 70 is intended for illustrative purposes only. The present invention is in no way limited thereto. For example, in order to avoid an endless loop from step 75 or step 80 to step 72, such as when a data link is not operating properly, the method may proceed to step 84 or declare an error after some maximum number of negative determinations at step 74 or step 80.

Another modification to the method 70 supports discrimination between bit rates below one ninth the detection bit rate. For a bit rate equal to or below one ninth the detection bit rate, 0xFF is received as 0x00. In a low bit rate discrimination embodiment, the receiver is configured to interpret 0x00 as an expected bit pattern at step 74, and to adjust to a low detection bit rate, such as one ninth a current detection bit rate, at step 78 in response thereto. For bit rates below one ninth a current detection bit rate, the start bit is extended to a tenth bit sample at the receiver, and as such, could be interpreted as a framing error (i.e., an expected stop bit is not detected). Therefore, the transition to step 76 may be made responsive to detection of a framing error or an all-zeros pattern at step 74. In this case, the sender may be configured to send an initial data byte such as 0xFF, or any other data byte in this case, to the receiver to cause the framing error or all-zeros pattern and thereby trigger detection bit rate reduction at step 76. Alternatively, step 74 may also be time-dependent, such that the bit rate is lowered at step 76 if the receiver does not receive an expected bit pattern within a predetermined time after entering the bit rate detection state. Thus, the sender sends 0xFF after either the initial data byte or the predetermined time, followed by the confirmation bit pattern.

In one embodiment, the modem 16 (FIG. 1) is a GPRS modem supporting bit rates up to a maximum of 115.2 kbps. Using the bit rate detection techniques described above, bit rates such as 115.2 kbps, 57.6 kbps (one half), 38.4 kbps (one third), 28.8 kbps (one quarter), and 19.2 kbps (one sixth), for example, are detected when 0xFF 0xFE, 0xFC, 0xF8, and 0xE0, respectively, are received in a bit rate detection state with 115.2 kbps as the detection bit rate. In a low bit rate discrimination embodiment, reduction of the detection bit rate to 14.4 kbps (one eighth), allows detection of still lower common bit rates of 4800 bps (one twenty-fourth the maximum bit rate), 2400 bps (one forty-eighth the maximum bit rate), and 1800 bps (one sixty-fourth the maximum bit rate), for example. Still lower bit rates are similarly detectable if the detection bit rate is further reduced. As described above, however, this magnitude of bit rate mismatch may be rare.

It will be appreciated that the above description relates to preferred embodiments by way of example only. Many variations on the systems and methods described above will be obvious to those knowledgeable in the field, and such obvious variations are within the scope of the invention as described and claimed, whether or not expressly described.

For example, although described primarily in the context of a local data link on an electronic device, the bit rate detection techniques described above may also be applied to other types of data links, including those between a modem and a remote communication device or system, or between other components associated with the same or different electronic devices.

It should also be appreciated that the invention is in no way limited to implementation in conjunction with a wireless modem, or any other type of modem. The bit rate detection techniques described above may be applied to any asynchronous serial data link.

What is claimed as the invention is:

1. A method for synchronizing transmit and receive bit rates used to transmit data over a data link between a modem and a processing device, comprising:

setting the receive bit rate to a highest supported bit rate;

receiving data over the data link;

detecting a bit pattern from the received data using the highest supported bit rate;

determining if the detected bit pattern matches an expected bit pattern corresponding to data transmitted at the highest supported bit rate;

if the detected bit pattern does not match the expected bit pattern, then determining if the detected bit pattern is one of a plurality of known bit patterns corresponding to fractional transmit bit rates, determining the transmit bit rate based on the known bit patterns, and setting the receive bit rate to the transmit bit rate;

monitoring the received data for a confirmation bit pattern; and if the confirmation bit pattern is not detected, then setting the receive bit rate to a default bit rate.

2. The method of claim 1, wherein the receive bit rate is set to the default bit rate if the confirmation bit pattern is not detected after a predetermined amount of time.

3. The method of claim 1, wherein the default bit rate is the highest supported bit rate.

4. The method of claim 1, wherein the default bit rate is a last-used receive bit rate.

5. The method of claim 1, wherein if the confirmation bit pattern is detected, then entering an operational state without regard to whether the bit pattern is detected.

6. The method of claim 1, wherein the bit pattern is a data byte having a value of 0xFF.

7. The method of claim 1, wherein the plurality of known bit patterns include data bytes having values of 0xFE, 0xFC and 0xE0.

8. the method of claim 1, wherein the received data includes a start bit, the bit pattern and a stop bit.

9. A mobile communication device, comprising:
a first communications controller;
a second communications controller;
a data link that couples the first communications controller to the second communications controller;
the first and second communications controllers being configured to transmit data over the data link between a processor and a modem;
the first communications controller being configured to transmit data over the data link using a transmit bit rate;
the second communications controller being configured to receive data over the data link and to detect a bit pattern in the received data; and the second communications controller being further configured to compare the detected bit pattern with a plurality of predetermined bit patterns and set a receive bit rate based on a detected match between the detected bit pattern and one of the predetermined bit patterns;

the second communication controller being further configured to monitor the received data for a confirmation bit pattern, and if the confirmation bit pattern is not detected, then set the receive bit rate to a default bit rate.

10. The mobile communication device of claim 9, wherein the first communication controller is coupled to the processor and the second communication controller is coupled to the modem.

11. The mobile communication device of claim 9, wherein the first communication controller is coupled to the modem and the second communication controller is coupled to the processor.

12. The mobile communication device of claim 9, wherein the data link is an asynchronous data link.

13. The mobile communication device of claim 9, wherein the modem is an internal modem.

14. The mobile communication device of claim 9, wherein the modem is an external modem connected via a PCMCIA port on the mobile communication device.

15. A mobile communication device, comprising:
means for transmitting data over a data link using a transmit bit rate;
means for receiving data from the data link;
means for detecting a bit pattern in the received data;
means for comparing the detected bit pattern with a plurality of predetermined bit patterns;
means for setting a receive bit rate based on a detected match between the detected bit pattern and one of the predetermined bit patterns; and
means for monitoring the received data for a confirmation bit pattern, and if the confirmation bit pattern is not detected, then setting the receive bit rate to a default bit rate.

* * * * *